(12) United States Patent
Morrison

(10) Patent No.: US 6,685,229 B2
(45) Date of Patent: Feb. 3, 2004

(54) HOSE AND CLAMP ASSEMBLY

(75) Inventor: Mark D. Morrison, New York, NY (US)

(73) Assignee: MPDI, New York, NY (US)

( * ) Notice: Subject to any disclaimer, the term of this patent is extended or adjusted under 35 U.S.C. 154(b) by 0 days.

(21) Appl. No.: 10/144,192

(22) Filed: May 13, 2002

(65) Prior Publication Data
US 2003/0090111 A1 May 15, 2003

Related U.S. Application Data
(60) Provisional application No. 60/334,725, filed on Nov. 15, 2001.

(51) Int. Cl.7 ................................................. F16L 33/02
(52) U.S. Cl. .......................................... 285/23; 285/252
(58) Field of Search .......................... 285/23, 252, 253, 285/420

(56) References Cited

U.S. PATENT DOCUMENTS

| | | | | |
|---|---|---|---|---|
| 2,308,607 A | * | 1/1943 | Jackson | 285/55 |
| 2,550,186 A | * | 4/1951 | Clamp | 285/8 |
| 3,365,218 A | * | 1/1968 | Denyes | 285/253 |
| 3,407,449 A | * | 10/1968 | Tetzlaff et al. | 24/19 |
| 3,729,027 A | * | 4/1973 | Bare | 285/244 |
| 3,954,290 A | * | 5/1976 | Corbin | 285/322 |
| 4,099,298 A | | 7/1978 | Gimenez | 24/27 |
| 4,453,289 A | * | 6/1984 | Kleykamp et al. | 24/20 TT |
| 5,028,077 A | | 7/1991 | Hurst | 285/8 |
| 5,185,913 A | * | 2/1993 | Campo et al. | 29/453 |
| 5,430,252 A | * | 7/1995 | Petersen | 174/65 R |
| 5,456,784 A | * | 10/1995 | Cogdill et al. | 156/229 |
| RE35,253 E | * | 5/1996 | Worley et al. | 285/243 |
| 5,622,391 A | * | 4/1997 | Belik | 285/23 |
| 6,398,265 B1 | * | 6/2002 | Sabo | 285/23 |

FOREIGN PATENT DOCUMENTS

| | | | | |
|---|---|---|---|---|
| DE | 3543717 | * | 6/1987 | 285/253 |
| DE | 4112274 | * | 10/1992 | 285/253 |
| FR | 2630808 | * | 11/1989 | 285/253 |

* cited by examiner

Primary Examiner—Eric K. Nicholson
(74) Attorney, Agent, or Firm—Hayes & Soloway P.C.

(57) ABSTRACT

A hose having clamps secured at opposing ends is disclosed. The clamps provide a compressive force to secure the hose to an appropriately sized tube. A portion of the clamp is disposed between an inner surface and an outer surface of the hose to help prevent accidental removal. A portion of the clamp may extend out an opening expending from a passageway formed between the inner and outer surface. The openings at the opposing end of the hose may be rotational aligned relative to each other and optionally to curves in the hose itself.

14 Claims, 4 Drawing Sheets

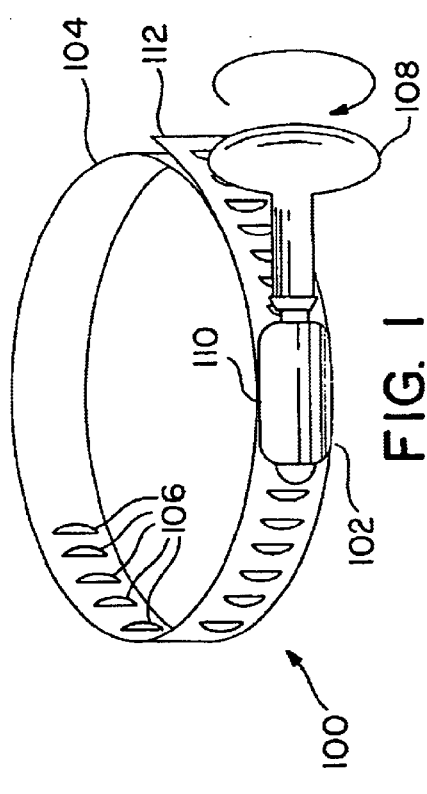
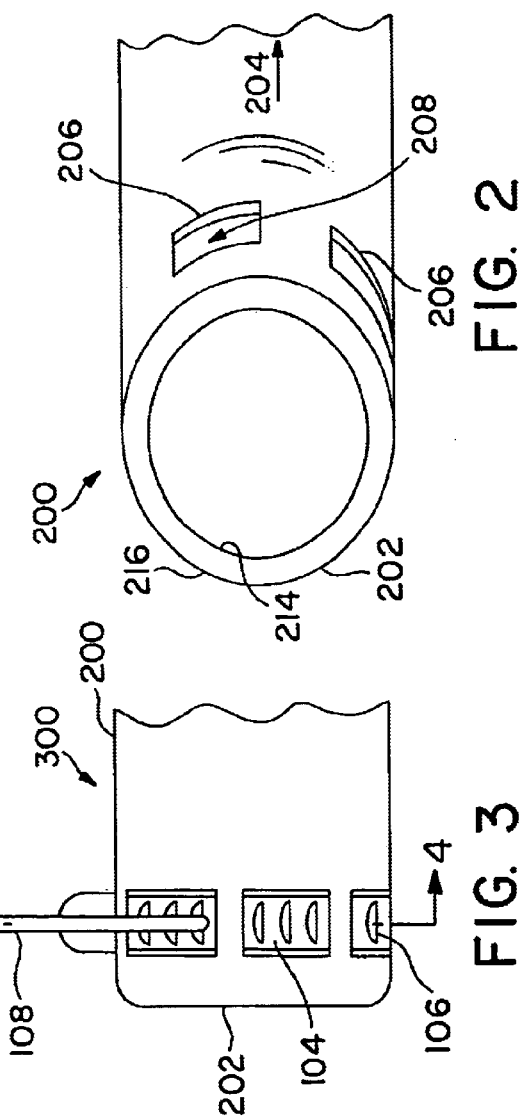
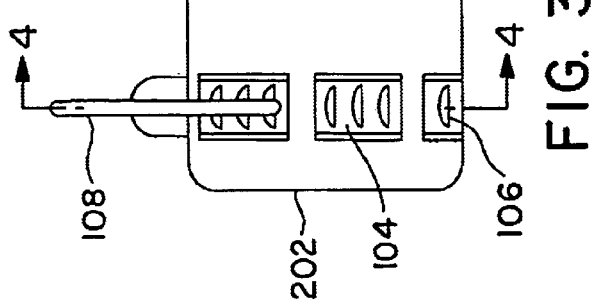

HOSE AND CLAMP ASSEMBLY

CROSS-REFERENCE TO RELATED APPLICATION

This application claims the benefit of copending U.S. provisional patent application Ser. No. 60/334,725 filed Nov. 15, 2001, the teachings of which are incorporated herein by reference.

FIELD OF THE INVENTION

The present invention relates generally to hoses and hose clamps for automotive, residential and industrial application, and more particularly to a hose with an integral clamp.

BACKGROUND OF THE INVENTION

Hoses have been used by automotive manufacturers for years to provide a fluid path from one location to another. These manufacturers have relied upon hose clamps to secure the hose at each end to a cooperating inlet or outlet. For example, radiator hoses have been use to connect a radiator to an engine block. Several varieties of removable clamps have been developed over the years. Some clamps require a screwdriver, socket, or nut driver to rotate a screw coupled to a band having serrations. As the screw is rotated, the screw threads advance the serrations causing a reduction in the inside diameter of the band. Other clamps require the use of a pair of pliers or a special tool to operate. These clamps are made from an elastically deformable material. When a compressive force is applied to tabs extending from the clamp, the inside diameter of the clamp is increased. Removal of the compressive force causes the inside diameter of the clamp to decrease, thereby applying a compressive force to a hose inserted therein There are problems associated with separate hoses and hose clamp. One problem is the higher installed cost associated with having to combine and assemble the components on an automotive assembly line versus receiving the combination ready to install. A second problem associated with separate components is the clamps may not be rotational aligned for the vehicle being assembled. Fixing the clamp to the hose in a predetermined alignment may reduce assembly time and errors. A third problem is the related overhead cost associated with inventorying and tracking separate components.

SUMMARY OF THE INVENTION

It is an object of the present invention to provide a length of hose having a first clamp secured at a first end of the hose and a second clamp secured at a second end of the hose.

It is an object of the present invention to provide a hose clamp having a thumbscrew for adjusting the length of a coupled band.

It is a further object of the invention to provide a hose and clamp combination comprising a hose having an inner surface and an outer surface, the hose further comprising a passageway formed between the inner surface and the outer surface, a band at least partially enclosed in the passageway, the band having a first end, a second end and a plurality of serrations, and a worm gear coupled to the serrations, whereby rotation of the worm gear adjusts the length of band between the worm gear and the first end.

The above and other objects, feature, and advantages of the present invention will be apparent in the following detailed description thereof when read in conjunction with the appended drawings wherein the same reference numerals denote the same or similar parts throughout the several views.

BRIEF DESCRIPTION OF THE DRAWINGS

FIG. 1 is a perspective view of an exemplary hose clamp consistent with the present invention;

FIG. 2 is a perspective view of an exemplary hose consistent with the present invention;

FIG. 3 is an end view of an exemplary hose and hose clamp assembly consistent with the present invention;

DETAILED DESCRIPTION OF THE INVENTION

Figure 4:
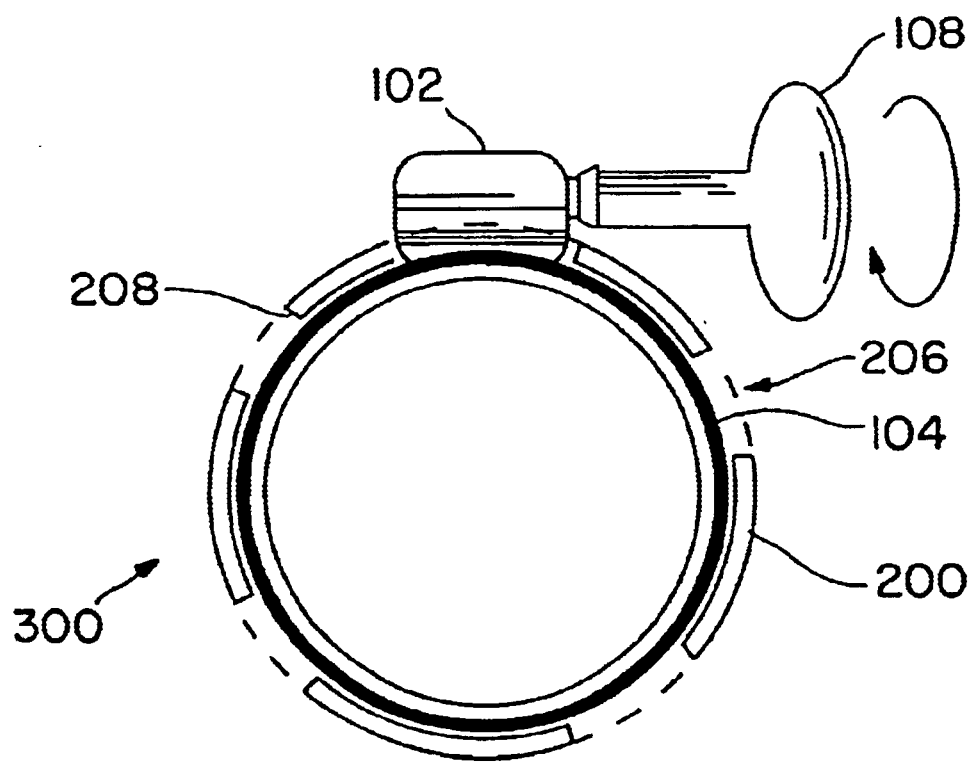
FIG. 4 is an end view of the hose and hose clamp assembly of FIG. 3.

FIG. 1 shows a hose clamp 100 including a band 104 and an enclosure 102 for housing a worm gear. The band 104 having a first end 110 and a second end 112. The enclosure 102 is coupled to the first end 110 of the band 104. The second end 112 of the band 104 is free to move relative to the enclosure 102. The band 104 has a plurality of spaced serrations 106. Extending from the enclosure may be a thumbscrew 108 for causing rotation of the worm gear. Alternatively, a driver receptacle may replace the thumbscrew. As the thumbscrew 108 is rotated by hand or with the help of a pair of pliers, screw threads on the worm gear cause the inside diameter or the band to increase or decrease.

FIG. 2 shows a section of hose 200 having a first end 202 and a second end 204 (not shown). The hose can be any length or diameter and may be formed in a predetermined shape. The hose has an inner surface 214 and an outer surface 216. The hose 200 may include one or more openings 206 located in proximity to the ends 202 and 204 of the hose 200. The opening 206 extending from the outer surface 216 to a circumferential passageway 208. The opening 206 may allow a hose clamp enclosure 102 to extend there through.

Figure 4A:
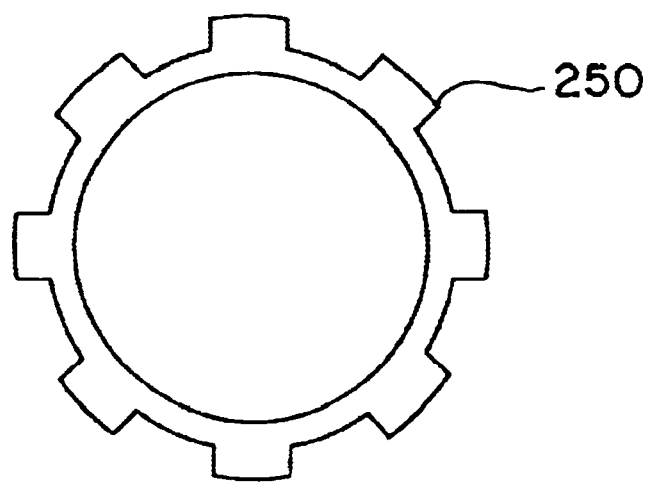
FIG. 4A is a profile view of a fuseable or removable core useful in forming a hose consistent with present invention.

The circumferential passageway 208 may be formed by a variety of processes. In one embodiment, the hose 200 may be formed by injection molding. The circumferential passageway 208 may be formed by using a fuseable or removable core. The core 250 (See FIG. 4A) may be insert molded with the hose. After the molding process is completed, the core is removed. A fuseable core may be removed by the addition of heat and a removable cover may be removed through the use of chemicals. A hose and clamp assembly 300 may be formed by threading the second end 112 of the band 104 through the circumferential passageway 208.

In another embodiment, the hose is made in layers. The inner layer may be made by an extrusion process. A clamp 100 may then be coupled to each end of a section of hose and then the hose and clamp may be insert molded. Prior to insertion in the molding machine, the inner and outer surfaces of the band may be coated with a spray or tape to allow the band 104 to slide relative to the hose 200 after molding.

Figure 5:
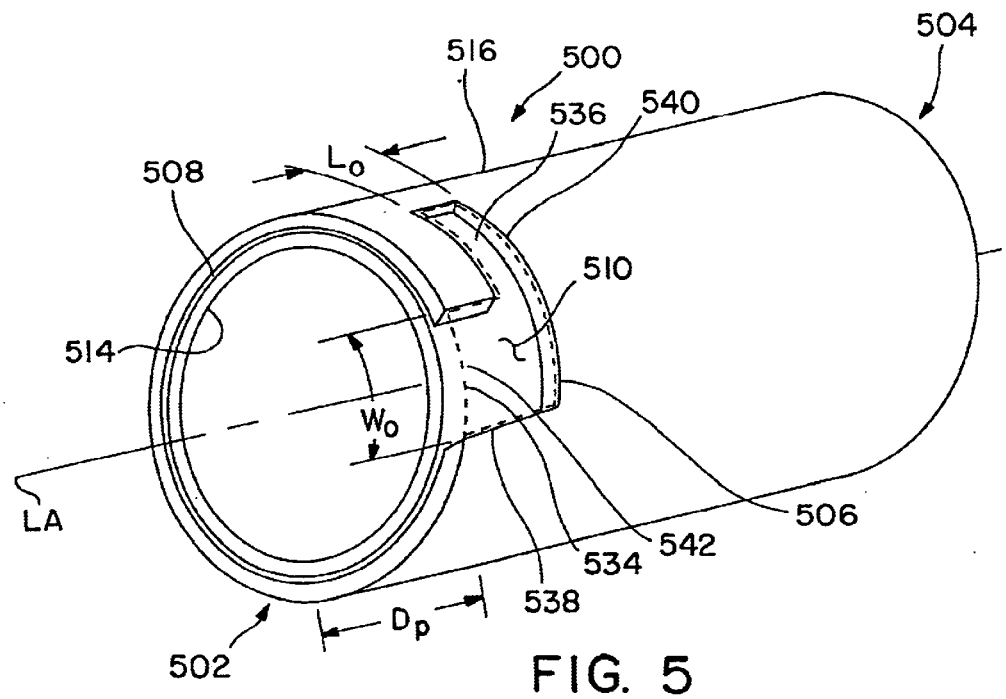
FIG. 5 is a perspective view of a second hose consistent with the present invention.
Figure 6:
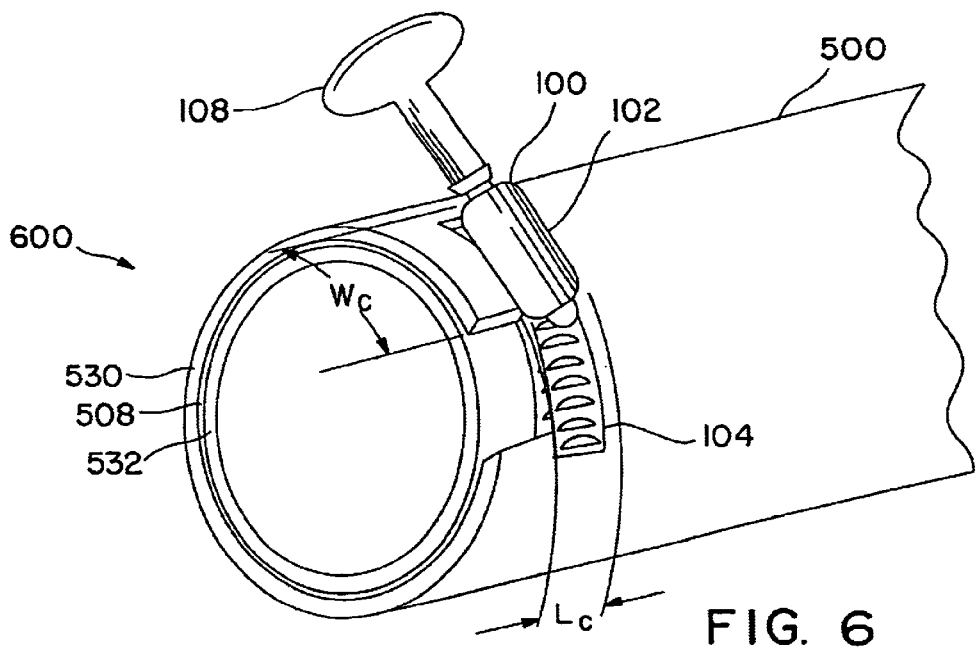
FIG. 6 is a perspective view of a second exemplary hose and hose clamp assembly consistent with the present invention.

FIGS. 5 and 6 show a hose 500 having a longitudinal axis LA extending from a first end 502 to a second end 504. The hose 500 has an inner surface 514 and an outer surface 516. A circumferential passageway 508 may be formed in between the inner surface 514 and the outer surface 516. The circumferential passageway 508 defining an inner hose section 532 having an intermediate surface 510 and an outer hose section 530. The circumferential passageway 508 may extend from the end 502 of the hose 500 a predetermined distance $D_P$ towards the opposite end 504 of the hose 500.

The outer hose section 530 may have one or more openings 506 located in proximity to the end 502. The opening 506 extending from the circumferential passageway to the outer surface 516. The opening 506 may be "L" shaped having a generally rectangular first leg portion 534 contiguous with a generally rectangular second leg portion 536. The first rectangular leg portion 534 having a first end 542 aligned with the first end 502 of the hose 500. A longer side 538 of the rectangular first leg portion 534 aligned parallel with the longitudinal axis LA of the hose 500 and a longer side 540 of the rectangular second leg portion disposed generally radially about the longitudinal axis LA. The rectangular first leg portion 534 having a width $W_O$ sufficient to allow a width $W_C$ of a clamp 100 to extend therein and the rectangular second leg portion 536 having a length $L_O$ sufficient to allow a length $L_C$ of the clamp 100 to extend therein.

As shown in FIG. 6, the clamp 100 includes the band 104 and the enclosure 102 for housing a worm gear. The worm gear may be rotated by the thumbscrew 108. The enclosure 102 and the band 104 may be axially inserted into the opening 506 and the passageway 508 respectively along the longitudinal axis LA of the hose 500. After being inserted, the enclosure 102 and the band 104 may be rotated (counterclockwise shown) about the longitudinal axis LA to "lock" the clamp 100 in place. In the "locked" position the clamp 100 cannot be axially removed, i.e. removed from the end of the hose without being first radially rotated about the longitudinal axis of the hose 500.

Figure 7:
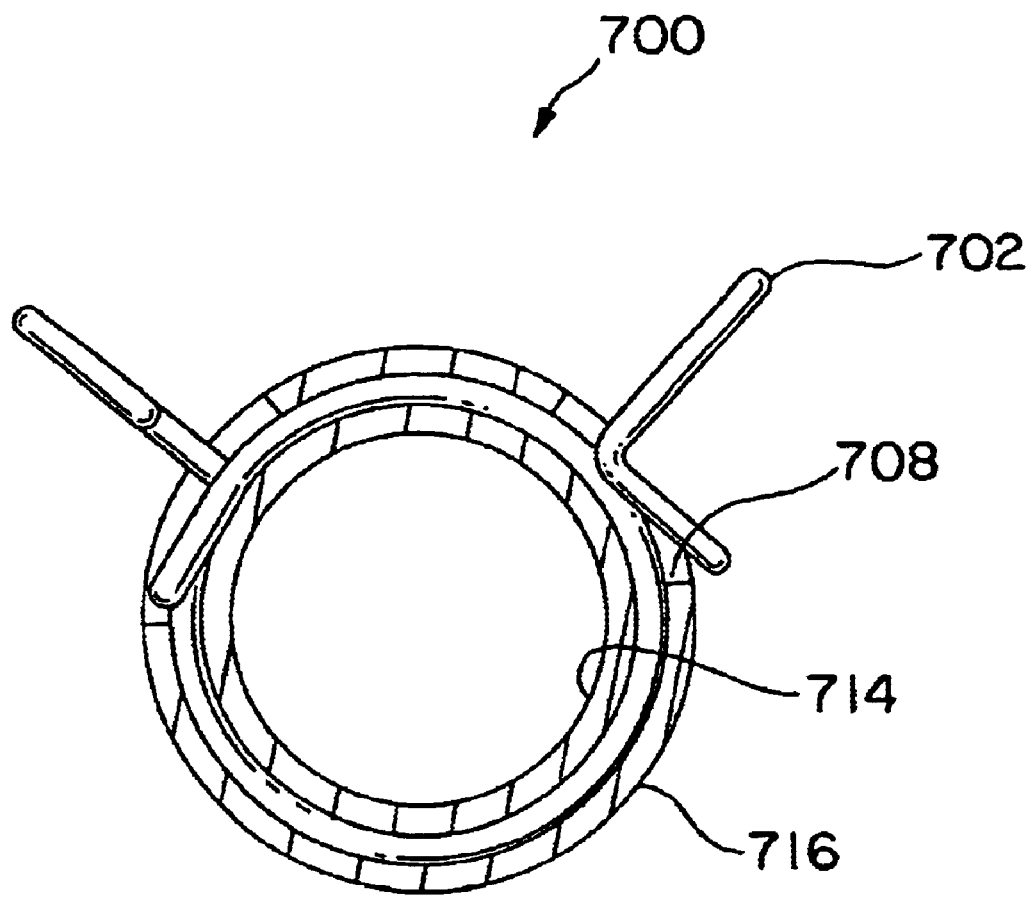
FIG. 7 is a section view of another exemplary embodiment consistent with the present invention.

As shown in FIG. 7, a self-tightening elastic hose clamp may be used in place of the clamp 100 without departing from the present invention.

The circumferential passage way may be formed by a variety of processes. In one embodiment, the hose 500 may be formed by injection molding. In another embodiment, the hose is made in layers. The inner layer being made by an extrusion process and the outer layer made by insert molding. In another embodiment, the hose may be extruded using known processes and the passageway is formed during a secondary step, for example a routing step.

FIG. 7 shows an end view of a hose and clamp assembly 700. At least a portion of a self-tightening elastic hose clamp 702 may be enclosed within a circumferential passageway 708 disposed between an inner surface 714 and an outer surface 716. A suitable hose clamp is described in U.S. Pat. No. 4,099,298. The U.S. Pat. No. 4,099,298 patent is incorporated herein by reference in its entirety.

It should be understood that, while the present invention has been described in detail herein, the invention can be embodied otherwise without departing from the principles thereof, and such other embodiments are meant to come within the scope of the present invention as defined in the following claim(s).

What is claimed is:

1. A conduit, comprising:
   a length of hose having a longitudinal axis extending from a first hose end to a second hose end, an inner surface, and an outer surface;
   a circumferential passageway formed in between the inner surface of the hose and the outer surface of the hose and extending a predetermined distance from the first end of the hose along the longitudinal axis of the length of hose, the passageway defining an inner hose section and an outer hose section; and
   an "L" shaped opening in the outer hose section, the "L" shaped opening having a first leg portion contiguous with a second leg portion, an axis of the first leg portion being aligned parallel with the longitudinal axis of the hose and an axis of the second leg portion being aligned radially to the longitudinal axis of the hose.

2. The conduit of claim 1, further comprising a clamp disposed within the "L" shaped opening.

3. The hose of claim 2, wherein the first leg portion has a width sufficient to allow a width of the clamp to extend therein and the second leg portion has a length sufficient to allow a length of the clamp to extend therein.

4. The hose of claim 2, wherein the second leg portion is oriented such that when the clamp is disposed in the second leg portion of the "L" shaped opening the clamp cannot be axially removed.

5. The hose of claim 2, wherein the "L" opening requires the clamp be axially inserted along the first leg portion and then rotated radially about the longitudinal axis of the hose into the second leg portion.

6. The hose clamp of claim 2, wherein the clamp is a band clamp.

7. The hose clamp of claim 2, wherein the clamp is a spring clamp.

8. A conduit, comprising:
   a length of hose having a longitudinal axis extending from a first hose end to a second hose end, an inner surface, and an outer surface;
   a circumferential passageway formed in between the inner surface of the hose and the outer surface of the hose and extending a predetermined distance from the first end of the hose along the longitudinal axis of the hose, the passageway defining an inner hose section and an outer hose section;
   a first generally rectangular opening in the outer hose section, a longer side of the first rectangular opening being aligned parallel with the longitudinal axis of the hose, and a first opening end aligned with the first hose end; and
   a second generally rectangular opening in the outer hose section, a longer side of the second rectangular opening extending radially about the longitudinal axis of the hose, the second rectangular opening extending from and contiguous with the first rectangular opening.

9. The conduit of claim 8, further comprising a clamp disposed within the second rectangular opening.

10. The hose of claim 9, wherein the first generally rectangular opening has a width sufficient to allow a width of the clamp to extend therein and the second leg portion has a length sufficient to allow a length of the clamp to extend therein.

11. The hose of claim 9, wherein the second leg portion is oriented such that when the clamp is disposed in the second leg portion the clamp cannot be axially removed.

12. The hose of claim 9, wherein the first rectangular opening requires the clamp be axially inserted along the longitudinal axis of the length of hose and then rotated radially about the longitudinal axis of the hose into the second leg portion.

13. The hose clamp of claim 9, wherein the clamp is a band clamp.

14. The hose clamp of claim 9, wherein the clamp is a spring clamp.

* * * * *